UNITED STATES PATENT OFFICE.

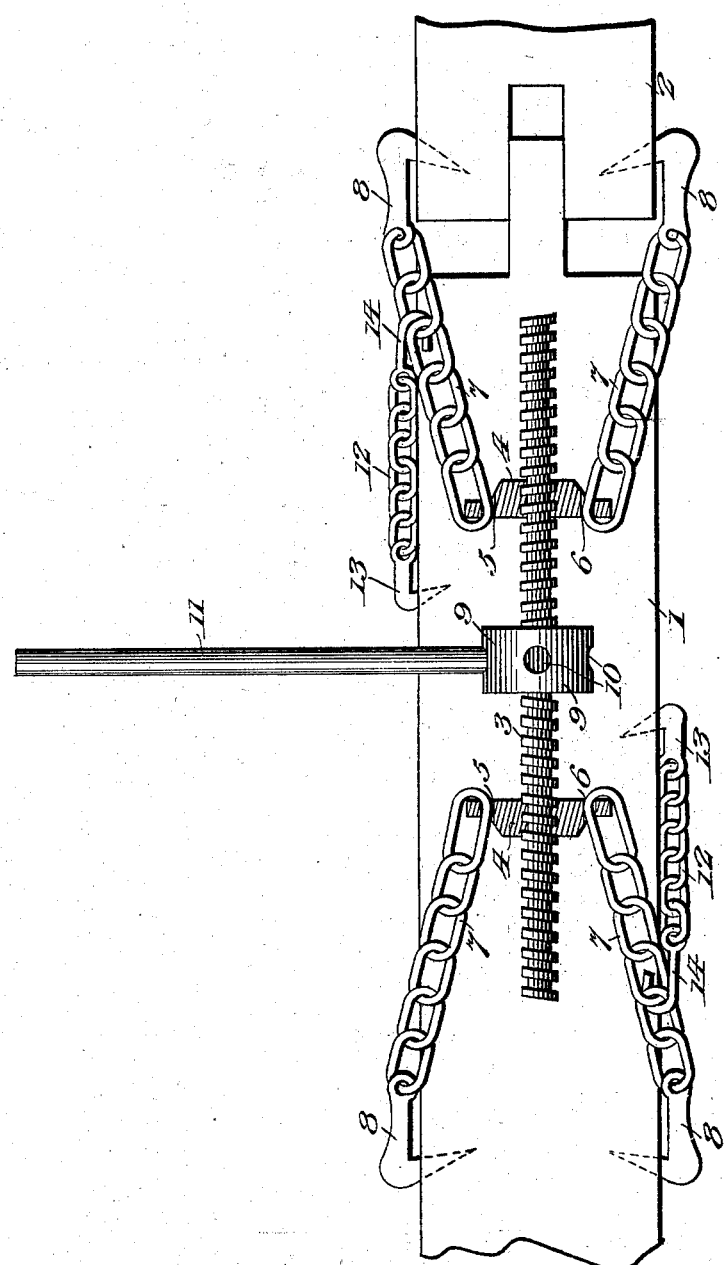

JOHN W. NORRIS, OF CRESTON, ILLINOIS.

GRAPPLE.

SPECIFICATION forming part of Letters Patent No. 698,544, dated April 29, 1902.

Application filed September 26, 1901. Serial No. 76,693. (No model.)

*To all whom it may concern:*

Be it known that I, JOHN W. NORRIS, a citizen of the United States, residing at Creston, in the county of Ogle and State of Illinois, have invented new and useful Improvements in Grapples, of which the following is a specification.

My invention relates to improvements in devices especially designed for builders' use for drawing two bodies, such as wooden beams, together in position for securing them to each other. It is especially designed for the purpose of drawing mortised beams together which have a tendency to separate, thereby leaving a loose joint; but it may also be applied wherever the use of such power is necessary or desirable.

The drawing represents a side elevation, partly in section, of my improvement applied to two beams.

In the drawing, 1 and 2 designate two beams having mortised ends.

3 designates a rod having right and left hand screw-threads, with nuts 4 working thereon. In the outer edges of the nuts 4 are provided openings 5 and 6, within which are secured the inner ends of short chains 7. These chains carry at their free ends hooks 8, which are adapted to be set in the beams 1 and 2, as shown in Fig. 1. A drum 9 is fixed centrally on the rod 3 for turning the same. The numeral 10 designates radial openings in the periphery of the drum 9 to be engaged by a lever 11.

To prevent the chains 7 from twisting, I provide short chains 12, having secured to their ends hooks 13 and 14. In operation the hooks 13 are set in the beams to be drawn together, while the hooks 14 are hooked in the links of the chains 7.

The operation of my device will be readily understood. After the hooks 8 have been secured in position in the beams 1 and 2 the rod 3 is rotated through the medium of the drum 9 and lever 11, which causes the nuts 4 and 5 to gradually approach each other, and consequently the tightening of the beams 1 and 2 will be effected.

Having thus fully described my invention, what I claim as new, and desire to secure by Letters Patent, is—

1. A device of the character described comprising a rod having right and left hand screw-threads, nuts having openings in their edges mounted upon the ends of said rod, chains secured in the openings in said nuts, hooks in the free ends of said chains, and means for rotating said rod.

2. The combination with a rod having right and left hand screw-threads and a drum secured centrally thereon, of nuts having openings in their edges mounted upon the ends of said rod, chains secured in the openings of said nuts, hooks at the free ends of said chains, and means for preventing the twisting of said chains.

3. The combination with a rod having right and left hand screw-threads and a drum secured centrally thereon, of nuts having opening in their edges mounted upon the ends of said rod, chains secured in the openings of said nuts, hooks at the free ends of said chains, and means for preventing the twisting of said chains consisting of a short chain having hooks at its ends adapted to engage the beams and the drawing-chains.

In testimony whereof I affix my signature in presence of two witnesses.

JOHN W. NORRIS.

Witnesses:
 CHAS. H. SEELEY,
 WM. U. WADHAMS.